US012560880B2

(12) United States Patent
Li et al.

(10) Patent No.: US 12,560,880 B2
(45) Date of Patent: Feb. 24, 2026

(54) HEATING CONTROL METHOD AND IMAGE FORMING APPARATUS

(71) Applicant: ZHUHAI PANTUM ELECTRONICS CO., LTD., Guangdong (CN)

(72) Inventors: Ronghua Li, Guangdong (CN); Hongyan Liu, Guangdong (CN); Hongcheng Xiang, Guangdong (CN); Yulin Liang, Guangdong (CN)

(73) Assignee: ZHUHAI PANTUM ELECTRONICS CO., LTD., Guangdong (CN)

( * ) Notice: Subject to any disclaimer, the term of this patent is extended or adjusted under 35 U.S.C. 154(b) by 41 days.

(21) Appl. No.: 18/493,254

(22) Filed: Oct. 24, 2023

(65) Prior Publication Data

US 2024/0142901 A1 May 2, 2024

(30) Foreign Application Priority Data

Oct. 27, 2022 (CN) ......................... 202211329806.6

(51) Int. Cl.
*G03G 15/20* (2006.01)
*G03G 15/00* (2006.01)

(52) U.S. Cl.
CPC ....... *G03G 15/205* (2013.01); *G03G 15/2039* (2013.01); *G03G 15/2046* (2013.01); *G03G 15/657* (2013.01); *G03G 2215/00599* (2013.01)

(58) Field of Classification Search
CPC ............. G03G 15/205; G03G 15/2039; G03G 15/2046; G03G 15/657; G03G 2215/00599; G03G 15/5004
See application file for complete search history.

(56) References Cited

U.S. PATENT DOCUMENTS 5,681,494 A * 10/1997 Suzuki ............... G03G 15/2003 219/505
5,904,871 A * 5/1999 Sakai ................. G03G 15/2039 399/69

(Continued)

FOREIGN PATENT DOCUMENTS

| | | |
|---|---|---|
| CN | 1637658 | 7/2005 |
| CN | 1658080 | 8/2005 |

(Continued)

OTHER PUBLICATIONS

European Search Report for European Patent Application No. 23204803.3 dated Mar. 18, 2024.

(Continued)

*Primary Examiner* — Stephanie E Bloss
*Assistant Examiner* — Laura Roth
(74) *Attorney, Agent, or Firm* — Carlson, Gaskey & Olds, P.C.

(57) ABSTRACT

Provided is a heating control method and image forming apparatus. The heating control method includes: when an image forming apparatus is in a printing state, determining a time duration t1 required for the fixing assembly to rise from a current temperature or a temperature at a set moment to a preset target temperature; and determining a time point of the fixing assembly to start heating based on a distance from a preset location to a central position of the fixing assembly, a travelling speed of a printing medium, and the time t1.

13 Claims, 2 Drawing Sheets

(56) References Cited

U.S. PATENT DOCUMENTS

| | | | | |
|---|---|---|---|---|
| 6,118,955 | A * | 9/2000 | Yoneda | G03G 15/2039 399/329 |
| 8,121,508 | B2 | 2/2012 | Hasegawa et al. | |
| 9,229,385 | B2 | 1/2016 | Ko | |
| 2005/0047811 | A1 * | 3/2005 | Sato | G03G 15/2046 399/69 |
| 2009/0245837 | A1 | 10/2009 | Campbell et al. | |
| 2011/0142470 | A1 * | 6/2011 | Kim | G03G 21/14 399/69 |
| 2012/0263489 | A1 | 10/2012 | Takeuchi | |
| 2013/0084092 | A1 * | 4/2013 | Ooyanagi | G03G 15/2039 399/69 |
| 2014/0205306 | A1 | 7/2014 | Miyamae | |
| 2017/0052491 | A1 * | 2/2017 | Hirota | G03G 15/5058 |

FOREIGN PATENT DOCUMENTS

| | | |
|---|---|---|
| CN | 1664711 | 9/2005 |
| CN | 1942833 | 4/2007 |
| CN | 101470391 | 7/2009 |
| CN | 101097433 | 7/2011 |
| CN | 103592833 | 2/2014 |
| CN | 105278304 | 1/2016 |
| CN | 111781811 | 10/2020 |
| CN | 217606243 | 10/2022 |
| JP | H04179980 | 6/1992 |
| JP | H0996991 | 4/1997 |
| JP | 2005049621 | 2/2005 |
| JP | 2014052568 | 3/2014 |
| JP | 2014052568 A * | 3/2014 |
| JP | 2014222276 | 11/2014 |
| JP | 2015125165 | 7/2015 |

OTHER PUBLICATIONS

Office Action for Chinese Patent Application No. 202211329806.6 dated Aug. 27, 2024.

Second Office Action for Chinese Patent Application No. 202211329806.6 dated Jan. 8, 2025.

Notice of Allowance for Russian Patent Application No. 2023126572/28 dated Jan. 15, 2024.

Third Office Action for Chinese Patent Application No. 202211329806.6 dated Mar. 10, 2025.

Notice of Allowance for Chinese Patent Application No. 2022113298066 dated Jun. 23, 2025.

* cited by examiner

HEATING CONTROL METHOD AND IMAGE FORMING APPARATUS

CROSS-REFERENCE TO RELATED APPLICATIONS

The present application claims priority to Chinese Patent Application No. 202211329806.6, filed on Oct. 27, 2022, the content of which is herein incorporated by reference in its entirety.

TECHNICAL FIELD

The present disclosure relates to the field of image forming technologies and, in particular, to a heating control method for a fixing assembly and an image forming apparatus.

BACKGROUND

In the related art of the image forming technology, the term fixing means to fix unstable and erasable toner on the paper through heating by a heating element of a fixing assembly, so as to achieve fixing.

In the conventional heating solution using halogen lamps, it is difficult to accurately control the starting time of heating due to the slow heating speed of the halogen lamps. In order to ensure that the toner can be fully fixed on the paper, it is necessary to heat the heating element of the fixing assembly in advance.

In the related art, there are also some heating assemblies with higher heating rates. For example, in a scheme using ceramic sheets for heating, if the ceramic sheets were heated in advance, more energy consumption will be wasted because of the high heating rate of the ceramic sheets. Therefore, it is necessary to provide a method for accurately determining the starting point of heating for the fixing process using the ceramic sheets.

SUMMARY

In order to overcome the above-mentioned problems in the related art, the main purpose of the present application is to provide a heating control method capable of reducing energy consumption of fixing assembly.

In order to achieve the above object, the present disclosure specifically adopts the following technical solutions.

The present disclosure provides a heating control method for controlling heating of a fixing assembly in an image forming apparatus, the method includes: when the image forming apparatus is in a printing state, determining a time duration t1 required for the fixing assembly to rise from a current temperature or a temperature at a set moment to a preset target temperature; and determining a time point of the fixing assembly to start heating based on a distance from a preset location to a central position of the fixing assembly, a travelling speed of a printing medium, and the time t1.

The present disclosure further provides an image forming apparatus, including a body and a fixing assembly, and the body is configured to control the heating of the fixing assembly using the heating control method as above.

The present disclosure further provides an image forming apparatus, including: at least one processor; and a memory configured to store instructions executable by the at least one processor; the instructions cause the at least one processor to: determine a time duration t1 required for a fixing assembly to rise from a current temperature or a temperature of a set moment to a preset target temperature; and determine a time point of the fixing assembly to start heating, based on a distance from a preset location to a central position of the fixing assembly, a travelling speed of a printing medium and the time t1.

Compared with the related art, the heating control method according to the present disclosure includes: when the image forming apparatus is in the printing state, determining the time t1 required for the fixing assembly to rise from the current temperature or the temperature of the set moment to the preset target temperature, determining the time point of the fixing assembly to start heating based on the distance from the preset location to the center of the fixing assembly, the traveling speed of the printing medium, and the time t1, such that during the printing process, the time point of the fixing assembly to start heating can be accurately determined to avoid waste of energy consumption due to excessively long heating time and to reduce the energy consumption of fixing assembly.

DESCRIPTION OF EMBODIMENTS

In order to make the purpose, the technical solution and advantages of the present disclosure clearer, the present disclosure will be further described in detail below in conjunction with the accompanying drawings and embodiments. It should be understood that the specific embodiments described here are only used to explain the present disclosure, but not to provide any limitation to the present disclosure.

In the description of the present disclosure, unless otherwise clearly specified and limited, the terms “first” and “second” are only used for the purpose of description, and shall not be understood as indicating or implying relative importance. The term “a plurality of” or “multiple” means two or more. The terms “connection” and “fix” shall be understood in a broad manner. For example, the “connection” may be fixed connection, detachable connection, integral connection, or electrical connection, and may be directly connection, or indirectly connection through an intermediary. Person skilled in the art can understand the specific meanings of the above terms in present disclosure according to specific situations.

It should be noted that when the image forming apparatus is started or woken up from a sleep state, it will gradually heat up from an ambient temperature to a certain set temperature. This process is called a preheating process. The process from the start of printing operation to the end of printing is called a printing stage. In the printing stage, when printing each piece of the printing medium (such as paper), the fixing assembly needs to be heated to a preset target temperature (which may be 195° C. for example, or other reasonable fixing temperatures). The preset target temperature is the temperature to which the fixing assembly needs to reach before performing fixing process. For example, when printing the first page of the printing medium, the fixing assembly needs to be heated to the preset target temperature first, then the fixing action is executed, and afterwards the heating of the fixing assembly is stopped. Next, when printing the second page of the printing medium, the fixing assembly continues to be heated to the preset target temperature, then the fixing action is executed, and afterwards stop the heating of the fixing assembly. In the same way, other pages of the printing medium are printed.

Figure 1:
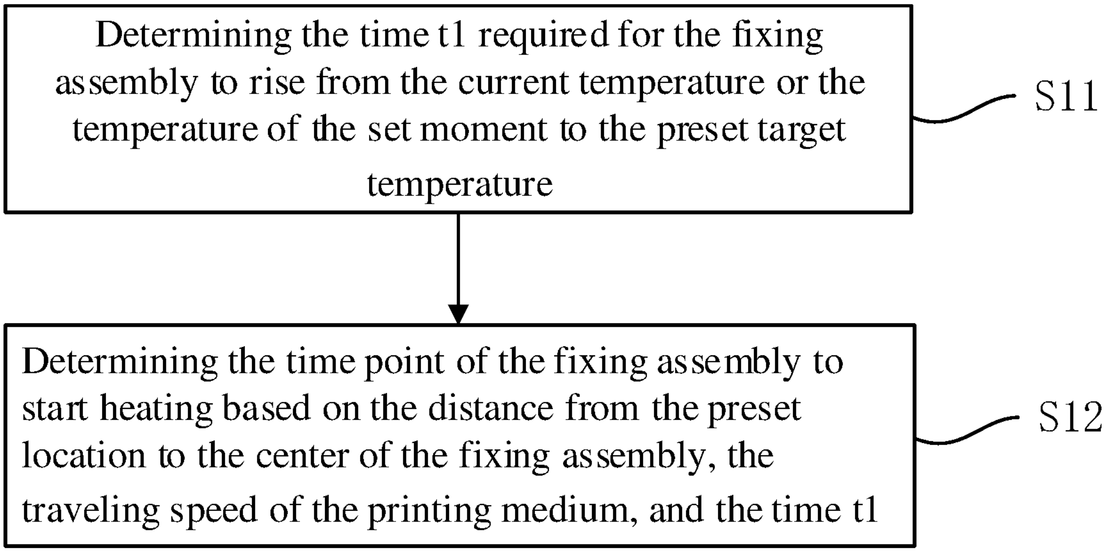
FIG. 1 is a flow chart of a heating control method according to an embodiment of the present disclosure.

FIG. 1 is a flow chart of a heating control method according to an embodiment of the present disclosure. As shown in FIG. 1, an embodiment of present disclosure provides a heating control method for controlling the heating process of a fixing assembly in an image forming apparatus, and the heating control method includes the following steps.

S11. Determining the time t1 required for the fixing assembly to rise from the current temperature or the temperature of the set moment to the preset target temperature.

In an embodiment, the heating rate, the current temperature or the temperature of the set moment, and the preset target temperature of the fixing assembly are determined first, and then the time t1 is calculated through the formula $t1=(T1-T0)/X$, where X represents the heating rate of the fixing assembly, T1 represents the preset target temperature of the fixing assembly, T0 represents the current temperature or the temperature of the setting moment of the fixing assembly. The temperature of the setting moment may be the temperature during a certain period of time. For example, the moment when a request of printing a page is received, or the moment when the controller activates the heater during the printing process of the machine, which is not limited to a certain value.

The current temperature refers to the temperature of the fixing assembly detected in real time. For example, during the printing process, before the heating is started (that is, when waiting for the heating to be started), if the current temperature of the fixing assembly is detected to be T0, and the time t1 is calculated by the formula $t1=(T1-T0)/X$, and then the time t6 required for the paper to travel from the current position of the paper to the fixing center position is calculated according to the traveling speed of the paper (that is, during the travel of the paper, the time t6 required for the paper to travel from the current position of the paper to the fixing center position can be calculated in real-time or by interval preset time), and then the time t6 is compared with the time t1. When the time t6 is close to the time t1, the heating is started. For example, when the time t6 is slightly less than or equal to time t1, the heating is started.

Figure 2:
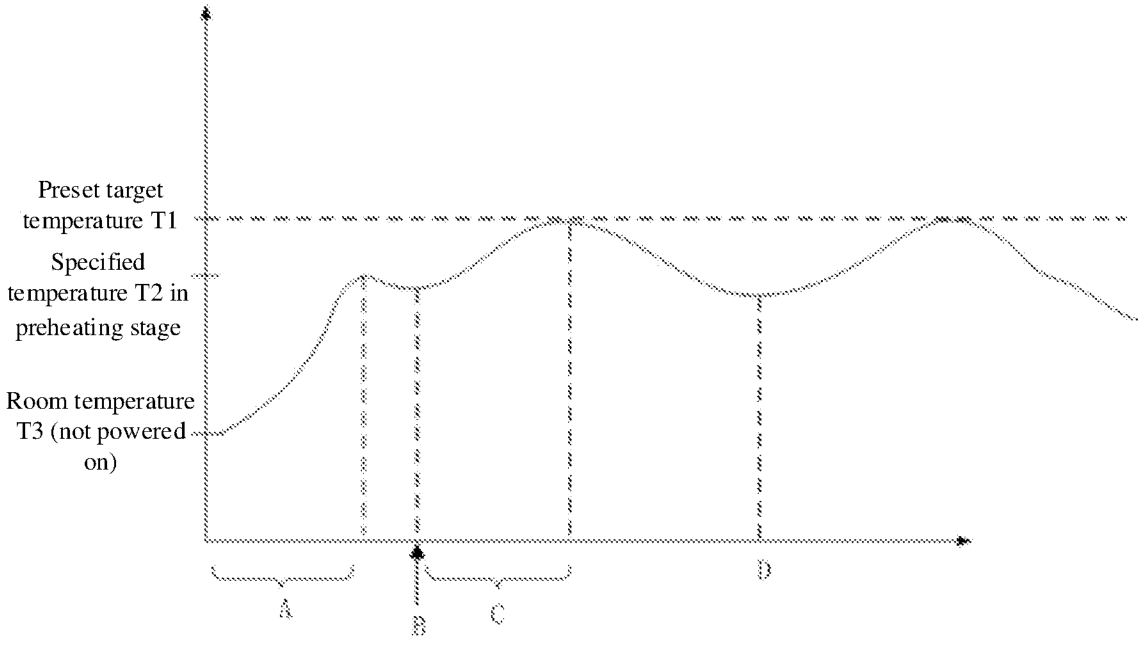
FIG. 2 is a waveform diagram showing temperature change of a fixing assembly during a printing process according to an embodiment of the present disclosure.

Since in the process of continuous printing, the temperature rise rate from the second page is different from that of the first page, the temperature rise of the first page is relatively steep, and the subsequent temperature rise and temperature drop are relatively gentle, as shown in FIG. 2. FIG. 2 is a waveform diagram showing temperature change of a fixing assembly during a printing process according to an embodiment of the present disclosure. In FIG. 2, A refers to the process of heating from the room temperature T3 in the cold state to the specified temperature T2 in the preheating stage when the machine is turned on. The heating rate calculated during this process is used to calculate the time point to start heating when printing the first page. B refers to the calculated time point to start heating when printing the first page. C refers to the process of heating from the time point to start heating to the preset target temperature T1 when printing the first page, the heating rate calculated during this process is used to calculate the time point to start heating when printing the second page. D refers to the time point to start heating when printing the second page.

Therefore, for the heating rate of fixing assembly, there are two situations as follows.

When the image forming apparatus is in the state of printing the first page of the printing medium, the heating rate of the fixing assembly can be calculated based on the temperature change of the fixing assembly in the preheating stage. For example, in the preheating stage, the heating rate can be calculated, according to the time taken for the temperature of the fixing assembly to rise by one degree (° C.), or the degree of the temperature rise of the fixing assembly per unit time. Then the time point of the fixing assembly to start heating when printing the first page of the printing medium is determined based on the heating rate.

In an embodiment, the heating rate X is estimated based on the time taken for the fixing assembly to heat up from the temperature in the cold state to the specified temperature (for example, 150° C., which is generally lower than the preset target temperature T1) in the preheating stage. That is, the heating rate X is calculated through the formula $X=(T2-T3)/t$, where T2 represents the specified temperature of the fixing assembly in the preheating stage, T3 represents the temperature of the fixing assembly in the cold state, and t represents the time it taken for the fixing assembly to be heated from T3 to T2. In an embodiment, the heating rate X is estimated by the time taken for the preheating stage of the machine to be heated from the cold state to the specified temperature. Since the heating rate X calculated by the above method is variable, for example, once turned on, the machine may have a different X value, and different machines may have different X values in the same environment. Therefore, the X value calculated by the above method already includes the environment of the image forming apparatus itself and the differences between the machines, and thereby has better applicability.

In an embodiment, the heating rate of the preheating stage will be calculated once turned on or woken up. For example, the heating rate can be calculated by the time required from a certain moment after being turned on to a moment when heated to 150° C. (or other temperature set by the image forming apparatus).

In some embodiments, the temperature of the fixing assembly when the image forming apparatus is turned on is already higher than the above-mentioned specified temperature (for example, the aforementioned 150° C.). For example, the image forming apparatus is shut down when the temperature is high, and then restarted. Alternatively, the image forming apparatus is restarted due to a fault, etc. Then, empirical data can be used as the heating rate X in these situations.

When the image forming apparatus is in the state of printing the nth page of the printing medium, the heating rate of the fixing assembly may be calculated based on the change from the temperature of the fixing assembly starting heating to the preset target temperature. In an embodiment, when the image forming apparatus is in the state of printing the nth page of the printing medium, the heating rate can be calculated based on the temperature of the fixing assembly starting heating when printing the (n−1)th page of the printing medium to the preset target temperature. Then the heating rate is substituted into the formula to calculate the time point of the fixing assembly to start heating when printing the nth page of the printing medium, where n is a positive integer, and $n \geq 2$.

For example, when printing the nth page of the printing medium, the heating rate of the fixing assembly may be calculated based on the temperature change of the fixing assembly in the stage from the temperature to start heating to the preset target temperature when printing the (n−1)th page of the printing medium. For example, when printing the (n−1)th page of the printing medium, in the stage from the temperature to start heating to the preset target temperature, the heating rate may be calculated based on the time taken for the temperature of the fixing assembly to rise by one degree, or based on the degree of the temperature rise of the fixing assembly per unit time. Then the time point of the fixing assembly to start heating when printing the nth page of the printing medium is determined based on the heating rate.

In an embodiment, a first heating rate of the fixing assembly is calculated based on the temperature change of the fixing assembly in the preheating stage, and then the first heating rate is substituted into the formula to calculate the time point of the fixing assembly to start heating when printing the first page of the printing medium time point. In addition, during the process of printing the first page of the printing medium, a second heating rate is calculated based on the temperature change of the fixing assembly from the temperature to start heating to the preset target temperature. Then the second heating rate is substituted into the formula to calculate the time point of the fixing assembly to start heating when printing the second page of the printing medium. In the similar way, the time point of the fixing assembly to start heating is calculated when printing the third page and subsequent pages after the third page printing medium.

In an embodiment, the heating rate calculated in the preheating stage is substituted into the formula to calculate the time point of fixing assembly to start heating when printing the first page of the printing medium, and the heating rate calculated when printing the (n−1)th page of printing medium is substituted into the formula to calculate the time point of the fixing assembly to start heating when printing the nth page of printing medium. That is, when printing each page of printing medium, the heating time point of the fixing assembly can be flexibly changed to achieve on-demand heating and further save energy consumption.

S12. Determining the time point of the fixing assembly to start heating based on the distance from the preset location to the center of the fixing assembly, the traveling speed of the printing medium, and the time t1.

In an embodiment, after determining the distance from the preset location to the center of the fixing assembly, the traveling speed of the printing medium, the current temperature of the fixing assembly or the temperature of the setting moment, the preset target temperature and the heating rate, the time point of the fixing assembly to start heating, that is, the value of t0 may be determined through the formula $(S-Vt0)/V \geq (T1-T0)/X$.

In the above formula, S represents the distance from the preset location to the center of the fixing assembly, V represents the traveling speed of the printing medium, T1 represents the preset target temperature of the fixing assembly, T0 represents the current temperature of the fixing assembly or the temperature of the setting moment, X represents the heating rate of the fixing assembly, t0 represents the time point of the fixing assembly to start heating to be obtained.

In an embodiment, the distance that the printing medium travels from the position provided with a sensor to the central position of the fixing assembly is set as the distance from the preset location to the central position of the fixing assembly. For example, in the printing stage, whether the printing medium triggers the specified sensor (such as the paper feeding sensor) is detected, and if yes, the first time is obtained through dividing the distance from the sensor to the fixing assembly by the traveling speed of the printing medium. Then the second time is obtained through dividing the difference between the preset target temperature of the assembly and the current temperature or the temperature of the set moment by the heating rate. The second time is set to be shorter than the first time, so as to determine the range that the time point of the fixing assembly to start heating needs to satisfy. That is, the moment that the fixing assembly reaches from the time point to heat through t1 needs to be no later than the moment when the printing medium travels to the center of the fixing assembly.

For example, it is known that the S value is 30 mm, the V value is 5 mm/s, and in the preheating stage before printing, the time required for the temperature of the fixing assembly to rise from 25° C. to 150° C. is 5 s, then the heating rate X is calculated to be 25° C./s through the formula X=(150° C.−25° C.)/5 s. When starting to print the first page of printing medium, if the current temperature of the fixing assembly or the temperature of the setting moment is 145° C., and the preset target temperature of the fixing assembly is 195° C., the time point t0 of the fixing assembly to start heating is calculated to be less than or equal to 4 s through the formula $(30-5t0)/5 \geq (195-145)/25$ when printing the first page of printing medium. If the time for which the printing medium travels to the preset location is t3, and $t3 \geq 0$, then the time duration from t3 to (t3+4) s is the time duration of the fixing assembly to start heating when printing the first page of the printing medium. That means, it is necessary to make the time point of the fixing assembly to start heating no later than (t3+4) s. For examle, when printing the first page of the printing medium, the time of the fixing assembly to start heating is (t3+4) s. In this way, the energy consumption of the fixing assembly can be reduced to the minimum.

When printing the first page of the printing medium, if the temperature of the fixing assembly to start heating is 140° C., the preset target temperature is 195° C., and the time required for the temperature of the fixing assembly to rise from 140° C. to 195° C. is 5 s, then the heating rate X is calculated to be 10° C./s through the formula X=(195° C.−145° C.)/55. When starting to print the second page of the printing medium, if the current temperature of the fixing assembly or the temperature of the setting moment is 168° C., and the preset target temperature of the fixing assembly is 195° C., then the time point t0 of the fixing assembly to start heating is calculated to be less than or equal to 2 s through the formula $(30-5t0)/5 \geq (195-165)/10$, when printing the second page of the printing medium. If the time for the printing medium to travel to the preset location is t4, $t4 \geq 0$, then the time duration between t4 to (t4+2) s is the time duration of the fixing assembly to start heating when printing the second page of the printing medium, that is, it is necessary to make the time point of the fixing assembly to start heating no later than (t4+2) s. For example, when printing the second page of printing medium, the time point of the fixing assembly to start heating is (t4+2) s, the energy consumption of the fixing assembly can be reduced to the minimum. In similar way, when printing the third page and other pages after the third page of the printing medium, the calculation method of the time point of the fixing assembly to start heating is not repeated here.

In the present disclosure, the time point t0 of the fixing assembly to start heating is accurately determined on the basis that the time for the printing medium to travel from a certain position to the center of the fixing assembly is greater than or equal to the time taken for the fixing assembly to heat from the initial temperature to the target temperature. That is, through the formula (S−Vt0)/V≥(T1−T0)/X, so as to avoid the waste of energy consumption caused by the excessively long heating time of the fixing assembly, and the excessively short heating time of the fixing assembly that cannot reach the preset target temperature, thereby affecting the fixed effect of toner on paper.

It can be understood that the interval between the moment reached from the time point of the fixing assembly to start heating through t1 and the moment when the printing medium travels to the center of the fixing assembly depends on at least one of paper type, printing mode, ambient temperature, ambient humidity, and machine operation time. That is, how long time to start heating in advance can be determined according to the environment or machine parameters. For example, if the user selects the high-quality printing mode, then in order to ensure sufficient fixing, it is necessary to start heating in more advance (because high-quality printing may have high image density, and need longer heating time for complete fixing).

For another example, if the paper selected by the user is relatively thick (such as envelope/letter printing), it is also necessary to start heating in more advance.

For another example, if it is detected that the temperature of the external environment is relatively low, heating may be started in more advance.

For another example, if it is detected that the humidity of the external environment is relatively high, it is also necessary to start heating in more advance.

For another example, if the machine has been operated for a long time, the detection result of the thermistor or the heating effect of the heater may be deviated from expectations, and the timing of heating can also be adjusted.

Based on the above embodiments, an embodiment of the present disclosure further provides an image forming apparatus, the image forming apparatus includes a main body and a fixing assembly, and the main body controls the heating of the fixing assembly with the heating control method of the heating control method according to any of the above embodiments.

Figure 3:
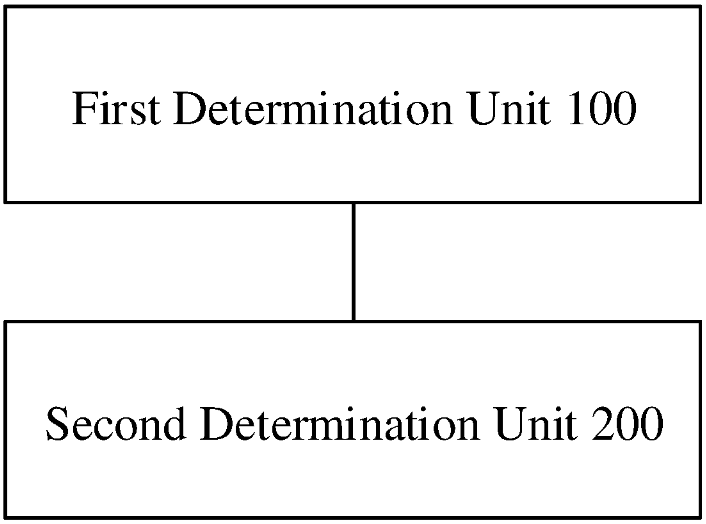
FIG. 3 is a block diagram of an image forming apparatus according to an embodiment of the present disclosure.

Based on the above embodiments, an embodiment of the present disclosure further provides an image forming apparatus, the image forming apparatus adopts the heating control method according to the above embodiments to control the heating of the fixing assembly. FIG. 3 is a block diagram of an image forming apparatus according to an embodiment of the present disclosure. In an embodiment, the image forming apparatus includes a first determination unit 100 and a second determination unit 200, and the first determination unit 100 is configured to determine the time t1 required for the assembly to rise from the current temperature or the temperature of the set moment to the preset target temperature, the second determination unit 200 is configured to determine the time point of the fixing assembly to start heating based on the distance from the preset location to the center of the fixing assembly, the traveling speed of the printing medium and the time t1.

Based on the above embodiments, the present disclosure further provides an image forming apparatus, which is a laser color printer, and the laser color printer is configured to control the heating of the fixing assembly with the heating control method according to any of the above embodiments. The difference between this embodiment and the above embodiment is that in this embodiment, the distance from the position where the image is generated to the center of the fixing assembly is set as the distance from the preset location to the center of the fixing assembly.

Figure 4:
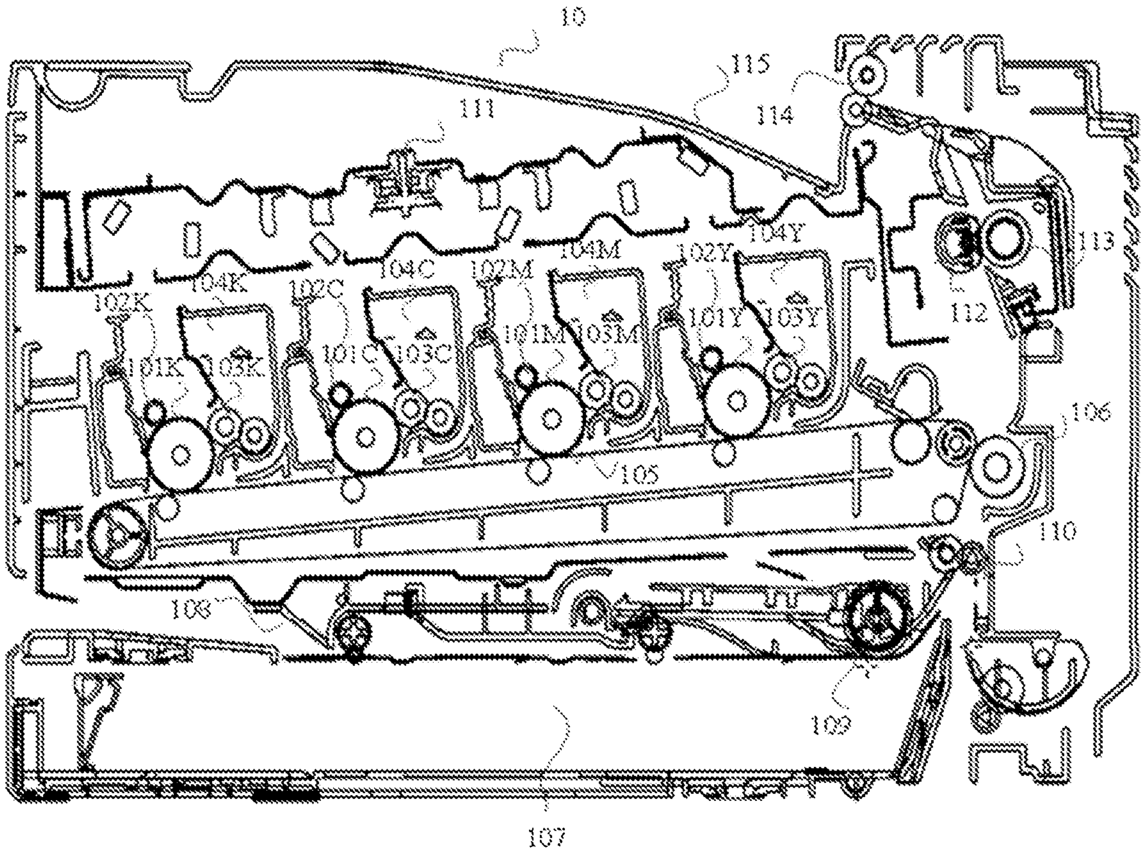
FIG. 4 is a schematic structural diagram of the image forming apparatus according to an embodiment of the present disclosure.

FIG. 4 is a schematic structural diagram of the image forming apparatus according to an embodiment of the present disclosure. The image forming apparatus is a laser color printer, and the laser color printer includes 10 including a transferring belt 105, a secondary transferring roller 106, an inlet tray 107, a manual feeding tray 108, a feeding roller 109, a transporting roller 110, a laser scanning unit (LSU) 111, a heating roller 112, a pressing roller 113, a discharging roller 114, a discharging tray 115, and the like. The processing cartridge group includes four processing cartridges, and each processing cartridge includes a photosensitive drum 101Y-101K, a charging roller 102Y-102K, a developing roller 103Y-103K, and a powder bin 104Y-104K for containing toner.

A laser scanning unit (LSU) 111 is a single LSU, which can provide four optical beams. Four charging rollers 102Y-102K are used to charge the surface of four photosensitive drums 101Y-101K, respectively. The four optical beams of the laser scanning unit emit laser beams to form electrostatic latent images on the surface of the photosensitive drums 101Y-101K, respectively. Four developing rollers 103Y-103K are used to develop and form a toner image of one color on the surface of the photosensitive drums 101Y-101K, respectively. The image forming apparatus 10 adopts a secondary transfer manner, that is, the four photosensitive drums 101Y-101K sequentially transfer the toner image to the transfer belt 105. Then, the color toner image formed on the transferring belt 105 is transferred to the papers via the second transferring roller 106. The inlet tray 107 is used to store the papers, and the feeding roller 109 is used to convey the stored papers to the convey path. The transporting roller 110 is used to convey the papers to the secondary transferring roller 106.

The secondary transferring roller 106 conveys the imaged papers to the clamping area of the heating roller 112 and the pressing roller 113. The heating roller 112 and the pressing roller 113 are used to fix the toner images on the papers. The heating roller 112 may adopt ceramic heating manner. The heating roller 112 and the pressing roller 113 conveys the fixed papers to the discharging roller 114, and the discharging roller 114 discharges the papers to the discharging tray 115 and stacks them.

In an embodiment, after each color LSU irradiates to the photosensitive drum, a corresponding image is formed, and the distance of each image traveling from the position where each color LSU irradiates the photosensitive drum to the fixing assembly (the clamping area of the heating roller 112 and the pressing roller 113) is defined is S, the printing speed is defined as V, the current temperature or the temperature of the setting moment of the fixing assembly is T0, the preset target temperature of the fixing assembly is defined as T1, and the heating rate is defined as X, then the time point t0 of fixing assembly to start heating is calculated through the formula (S−Vt0)/V≥(T1−T0)/X.

In some embodiments, the distance of the image travelling from the position where the LSU irradiates the photosensitive drum 101Y to the fixing assembly may be defined as S. The distance of the image travelling from the position where the LSU irradiates the photosensitive drum 101M to the fixing assembly may also be defined as S. Alternatively, the distance of the image travels from the position where the LSU irradiates the photosensitive drum 101C to the fixing assembly may be defined as S, or the distance of the image travelling from the position where the LSU irradiates the photosensitive drum 101K to the fixing assembly may also be defined as S.

In some embodiments, the distance S can be defined as a sum of the distance that the image on the photosensitive drum travels from the position where the LSU irradiates the photosensitive drum to the transfer belt, the distance that the image on the transferring belt travels as transferred to the paper, and the distance that the paper travels from the transferring point to the central position of the fixing assembly. The central position of the fixing assembly refers to the pressure area formed between the heating roller 112 and the pressing roller 113.

In an embodiment, a top of data (TOD) event signal configured to control the image generation is used to detect the time point of the fixing assembly to start heating. The TOD signal is usually not triggered. When the image is about to be formed, the TOD signal is triggered and the current time t5 is recorded, that is, the time duration of the fixing assembly to start heating can be determined. For example, after calculating the time point t0 to start heating according to the formula (S−Vt0)/V≥(T1−T0)/X, the time duration between t5 and t5+t0 is the time duration of fixing assembly to start heating when printing the medium. For example, the time of the fixing assembly to start heating is t5+t0.

In the present disclosure, on the basis that the time required for the image to travel from the position where the LSU irradiates the photosensitive drum to the fixing assembly is greater than or equal to the time taken for the fixing assembly to heat from the initial temperature to the target temperature, that is, the time point t0 of the fixing assembly to start heating is accurately determined through the formula (S−Vt0)/V≥(T1−T0)/X, so as to avoid the waste of energy consumption due to the excessively long heating time of the fixing assembly, and to avoid the failure to reach the preset target temperature due to the excessively short heating time of the fixing assembly, which may in turn adversely affecting the fixing effect of the toner on the paper.

The present disclosure may be a system, method and/or computer program product. The computer program product may include a computer-readable storage medium having computer-readable program instructions loaded thereon for causing a processor to implement various aspects of the present disclosure.

A computer-readable storage medium may be a tangible device that can hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage medium include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory sticks, floppy disks, mechanically coded devices, such as printers with instructions stored thereon Hole cards or raised structures in grooves, and any suitable combination of the above. Computer-readable storage medium, as used herein, are not to be construed as transient signals per se, such as radio waves or other freely propagating electromagnetic waves, electromagnetic waves propagating through waveguides or other transmission medium, or through electrical wires transmitted electrical signals.

The above are only specific embodiments of the present disclosure, but the scope of protection of the present disclosure is not limited thereto. Any variation or substitution that one skilled in the art can readily envisage within the technical scope according to the present disclosure shall be covered within the scope of protection of the present disclosure. Therefore, the protection scope of the present disclosure should be determined by the protection scope of the claims.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A heating control method for controlling heating of a fixing assembly in an image forming apparatus, comprising:
- when the image forming apparatus is in a printing state,
- determining a time duration t1 required for the fixing assembly to rise from a current temperature or a temperature at a set moment to a preset target temperature; and
- determining a time point of the fixing assembly to start heating based on a distance from a preset location to a central position of the fixing assembly, a travelling speed of a printing medium, and the time t1;
- wherein said determining of the time duration t1 required for the fixing assembly to rise from the current temperature or the temperature at the set moment to the preset target temperature comprises:
- determining a heating rate of the fixing assembly; and
- calculating the time duration t1 based on the heating rate of the fixing assembly, the current temperature or the temperature at the set moment, and the preset target temperature; and
- wherein said determining the heating rate of the fixing assembly comprises:
- when the image forming apparatus is in a state of printing a first page of the printing medium, calculating the heating rate based on a temperature change of the fixing assembly in a preheating stage.

2. The heating control method according to claim 1, wherein said calculating the heating rate based on the temperature change of the fixing assembly in the preheating stage comprises:
- in the preheating stage,
- calculating the heating rate based on time consumed for a temperature rise of the fixing assembly by one degree centigrade.

3. The heating control method according to claim 1, wherein said calculating the heating rate based on the temperature change of the fixing assembly in the preheating stage comprises:
- in the preheating stage,
- calculating the heating rate based on a degree of temperature rise of the fixing assembly per unit time.

4. The heating control method according to claim 1, wherein said determining the heating rate of the fixing assembly comprises:

when the image forming apparatus is in a state of printing an nth page of the printing medium, where n is a positive integer and n≥2, calculating the heating rate based on a temperature change from a temperature of the fixing assembly when heating was started to the preset target temperature.

5. The heating control method according to claim 4, wherein said determining the heating rate of the fixing assembly comprises:

when the image forming apparatus is in the state of printing the nth page of the printing medium, calculating the heating rate based on a temperature of the fixing assembly when heating was started during printing an (n−1)th page of the printing medium and the preset target temperature, where n is a positive integer, and n≥2.

6. The heating control method according to claim 4, wherein said calculating the heating rate based on the temperature change from the temperature of the fixing assembly when heating was started to the preset target temperature comprises:

in a stage from the temperature of the fixing assembly when heating was started to the preset target temperature, calculating the heating rate based on time consumed for a temperature rise of the fixing assembly by one degree centigrade.

7. The heating control method according to claim 4, wherein said calculating the heating rate based on the temperature change from the temperature of the fixing assembly when heating was started to the preset target temperature comprises:

in a stage from the temperature of the fixing assembly when heating was started to the preset target temperature, calculating the heating rate based on a degree of a temperature rise of the fixing assembly per unit time.

8. The heating control method according to claim 1, wherein the distance from the preset location to the central position of the fixing assembly is:

a distance that the printing medium travels from a position provided with a sensor to the central position of the fixing assembly.

9. The heating control method according to claim 1, wherein the distance from the preset location to the central position of the fixing assembly is:

a distance that an image travels from a position where the image was generated to the central position of the fixing assembly.

10. The heating control method according to claim 1, wherein the time point of the fixing assembly to start heating satisfies:

a resultant moment in time following elapse of the time duration t1 starting from the time point is no later than a moment when the printing medium travels to the central position of the fixing assembly.

11. The heating control method according to claim 10, wherein a time interval between the resultant moment in time following the elapse of the time duration t1 starting from the time point and the moment when the printing medium travels to the central position of the fixing assembly is determined further based on at least one of paper type, printing mode, ambient temperature, ambient humidity, or machine operation duration.

12. An image forming apparatus, comprising:

at least one processor; and a memory configured to store instructions executable by the at least one processor;

wherein the instructions cause the at least one processor to:

determine a time duration t1 required for a fixing assembly to rise from a current temperature or a temperature of a set moment to a preset target temperature; and determine a time point of the fixing assembly to start heating, based on a distance from a preset location to a central position of the fixing assembly, a travelling speed of a printing medium and the time t1;

wherein said determining of the time duration t1 required for the fixing assembly to rise from the current temperature or the temperature at the set moment to the preset target temperature comprises:

determining a heating rate of the fixing assembly; and calculating the time duration t1 based on the heating rate of the fixing assembly, the current temperature or the temperature at the set moment, and the preset target temperature; and wherein said determining the heating rate of the fixing assembly comprises:

when the image forming apparatus is in a state of printing a first page of the printing medium, calculating the heating rate based on a temperature change of the fixing assembly in a preheating stage.

13. A heating control method for controlling heating of a fixing assembly in an image forming apparatus, comprising:

when the image forming apparatus is in a printing state, determining a time duration t1 required for the fixing assembly to rise from a current temperature or a temperature at a set moment to a preset target temperature; and determining a time point of the fixing assembly to start heating based on a distance from a preset location to a central position of the fixing assembly, a travelling speed of a printing medium, and the time t1, wherein said determining of the time duration t1 required for the fixing assembly to rise from the current temperature or the temperature at the set moment to the preset target temperature comprises:

determining a heating rate of the fixing assembly; and calculating the time duration t1 based on the heating rate of the fixing assembly, the current temperature or the temperature at the set moment, and the preset target temperature;

wherein said calculating the time duration t1 based on the heating rate of the fixing assembly, the current temperature or the temperature at the set moment, and the preset target temperature comprises:

calculating the time duration $t1$ by $a$ formula of $t1=(T1-T0)/X$, where T1 represents the preset target temperature of the fixing assembly, T0 represents the current temperature of the fixing assembly or the temperature at the set moment, and X represents the heating rate of the fixing assembly; and wherein said determining the heating rate of the fixing assembly comprises:

when the image forming apparatus is in a state of printing a first page of the printing medium, calculating the heating rate based on a temperature change of the fixing assembly in a preheating stage.

* * * * *